M. JAKAB.
ANIMAL TRAP.
APPLICATION FILED OCT. 12, 1916.
1,222,406.
Patented Apr. 10, 1917.
2 SHEETS—SHEET 1.
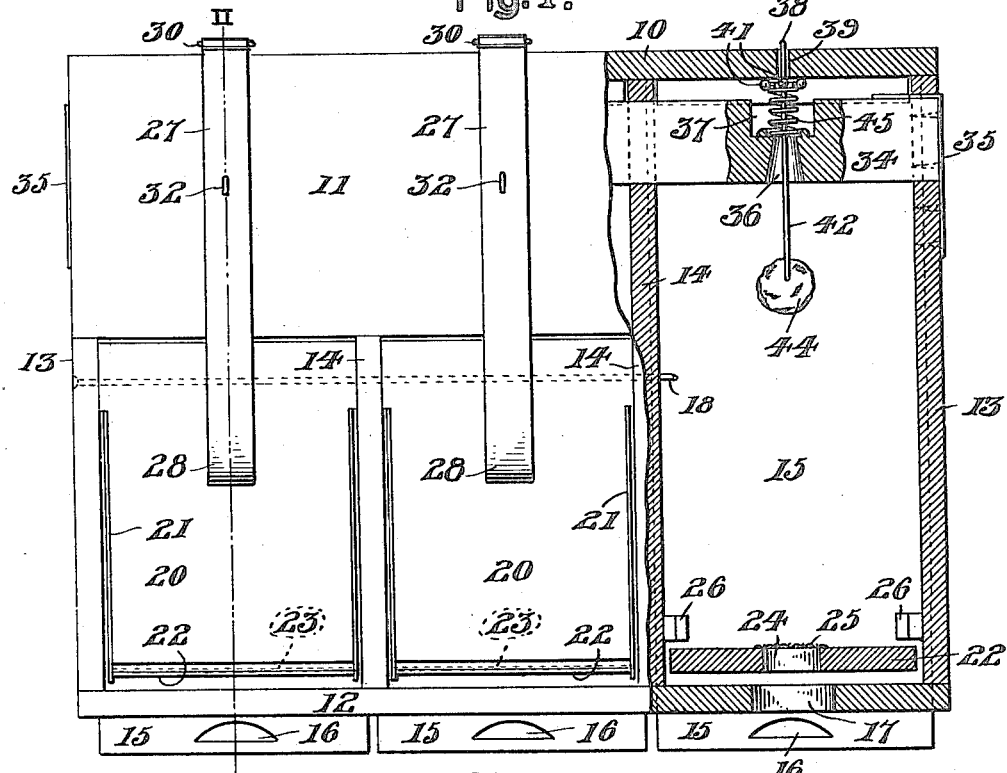
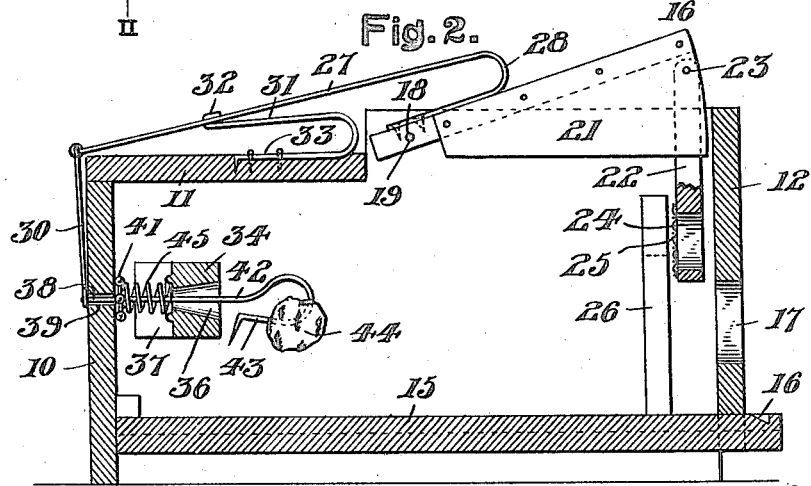
Inventor
M. Jakab
By N. M. Wilson
Attorney

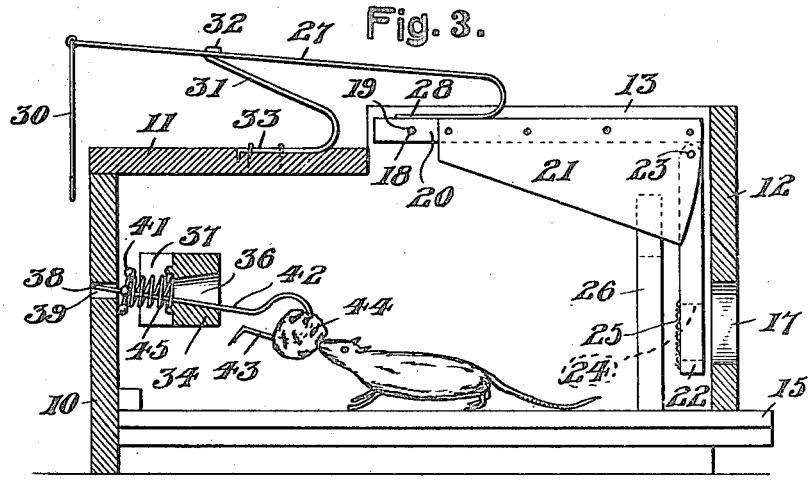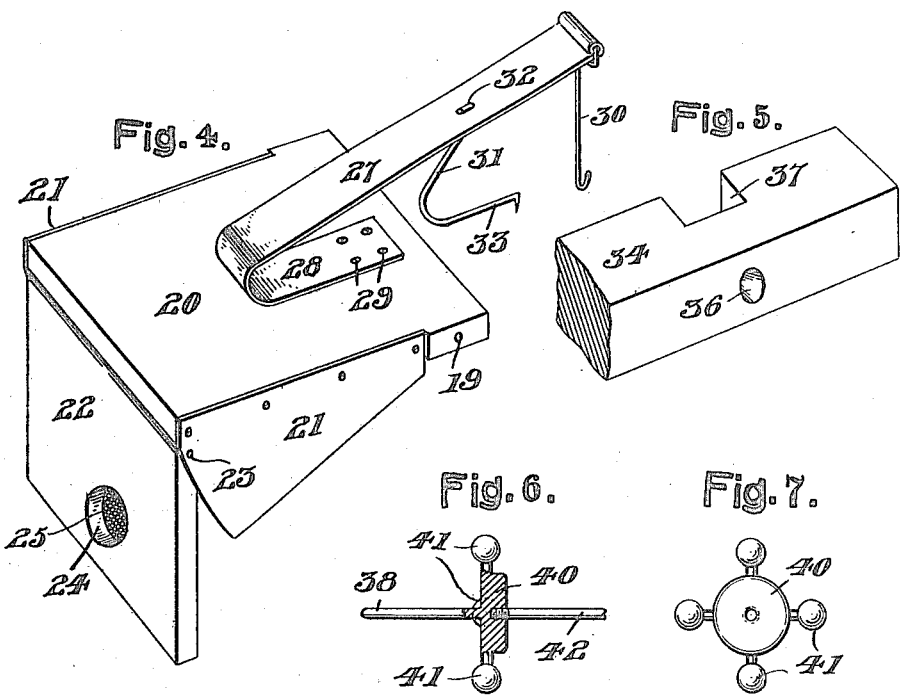

UNITED STATES PATENT OFFICE.

MIKE JAKAB, OF WOODLAND, MAINE.

ANIMAL-TRAP.

1,222,406.  Specification of Letters Patent.  Patented Apr. 10, 1917.

Application filed October 12, 1916. Serial No. 125,233.

*To all whom it may concern:*

Be it known that I, MIKE JAKAB, a citizen of the United States of America, residing at Woodland, in the county of Washington and State of Maine, have invented certain new and useful Improvements in Animal-Traps, of which the following is a specification.

This invention relates to certain new and useful improvements in animal traps.

The primary object of the present invention is to provide an animal trap especially for the trapping of animals of the smaller type as rodents and in which the animal is trapped in a live condition and so retained until otherwise disposed of.

A further object of the invention is to provide an animal trap that may be constructed in a single structure to provide a plurality of independently operating traps with independent sliding trap doors for the lower end of each trap whereby the desired ones may be emptied as required.

A further object of the invention is to provide an animal trap that is extremely simple in construction and operation, the same embodying few working parts, and each trap being independently constructed whereby one may be able to discern whether an animal has been caught therein with the trap door lowered.

With the above general objects in view and others that will appear as the nature of the invention is better understood, the same consists in the novel construction, combination and arrangement of parts to be hereinafter more fully described and then claimed.

In the accompanying drawings forming a part of this application and to which reference is had herein by like characters designating corresponding parts throughout the several views:—

Figure 1 is a top plan view with the cover partially broken away to illustrate the interior of one of the traps.

Fig. 2 is a longitudinal sectional view on line II—II of Fig. 1, the trap being in set position.

Fig. 3 is a similar view with the trap operated or moved to closed position.

Fig. 4 is an enlarged detail perspective view of one of the trap doors and operating springs therefor removed from the trap casing.

Fig. 5 is an enlarged detail perspective view of a portion of one of the bars for supporting the bait hooks, and Figs. 6 and 7 are section and elevational views respectively of the bait hooks.

For the purpose of convenience, Fig. 1 shows the trap constructed in series to include three independently operating traps, but it is to be understood that the device may include any number of traps, it being particularly desired that the same be constructed in a series of six traps.

The device comprises in detail a casing including a rear wall 10, a top wall 11 and a front wall 12, the front and rear walls 12 and 10 respectively being connected by the end walls 13 and the partitions 14 dividing the device into a series of independently operating traps. As shown in Fig. 1, each trap casing is provided with a sliding bottom wall or tray 15 having a finger notch 16 in the forwardly projecting end thereof by which the tray may be readily removed from the casing to remove a trapped animal therefrom or for purposes of cleaning the same and placing bait upon the bait hooks to be presently described. The front wall 12 of the trap has a series of entrance openings 17, one for each trap.

As clearly shown in Figs. 1 and 2 the top wall 11 terminates substantially midway of the depth of the trap and leaves the front section thereof exposed. A longitudinal rod 18 is passed through the partitions 14 and the end walls 13 and has pivoted thereon as at 19 between the partitions and end walls, swinging covers 20, one for each trap casing. Side plates 21 are connected to the swinging covers 20 adjacent the partitions and end walls and insure a closure at this point of the trap at all times during its different positions. A trap door 22 is hinged at its upper end as at 23 to the side plates 21, as clearly shown in Fig. 4 and is adapted to be moved from the position shown in Fig. 2 to the position shown in Fig. 3 to close the entrance opening 17 of the front wall 12, it being noted that the trap door 22 has an opening 24 therein covered by a screen 25 which is superposed relative to the entrance opening 17 so that sufficient light may enter each individual trap to enable one to see whether or not an animal has been caught. The trap door 22 is guided in its vertical movements by the vertical bars 26 fixed to the end walls and partitions 13 and 14, as clearly shown in Figs. 1 and 2.

The mechanism for holding the trap door in opened and closed position is more clearly shown in Figs. 2 and 4 and includes a metal bar 27 bent upon itself as at 28 and secured as at 29 to the swinging covers 20, a separate bar and operating mechanism therefor being provided for each trap. The bar 27 projects rearwardly of the casing as shown in Figs. 2 and 3 and each bar has pivotally connected thereto a depending hook 30. In order to hold the swinging covers 20 in the position shown in Fig. 3 with the trap doors 22 in closed position, there is provided a spring 31 for each bar 27, the said spring being connected at one end as at 32 to the adjacent bar while the opposite end 33 thereof is secured within the cover wall 11. The trap door when closed assumes the position as shown in Fig. 3 with the spring 31 expanded, but when the trap door is open as shown in Fig. 2 the spring is compressed as herein shown.

The mechanism for placing the spring under tension and retaining the same in position as shown in Fig. 2 comprises the bait mechanism which includes a bar 34 extending from end to end of the casing adjacent the rear wall thereof and is retained in such position by end plates 35 in the form of straps engaging the ends of the bait bar 34 and the outer sides of the end walls 13. The bait bar 34 within each trap has a transverse opening therein including a forward conical passage 36 and a rear rectangular seat or opening 37. The bait hook includes a rearwardly projecting rod 38 extending through an opening 39 provided in the rear wall of each trap, the forward portion of the rod having a block 40 which carries radial arms 41, the form of which is more clearly shown in Figs. 6 and 7. A bait hook 42 has one end projected through the conical passage 36 in the bait bar 34 and has threaded connection with the block 41 while the forward portion thereof is curved to provide a hook 43 upon which the bait 44 is mounted. An expansion coil spring 45 surrounds the bait hook 42 between the block 40 and the bait bar 34 as is clearly shown in Figs. 2 and 3. With the spring 45 projecting the rod 38 rearwardly of the casing, the same is adapted to be engaged by the hook 30 as shown in Fig. 2 with the bar 27 lowered to elevate the trap door 22 and place the spring 31 under tension.

In order to set the trap, the trap doors 15 may be moved outwardly to permit access to the bait hook 43 from the lower side of the casing for purposes of attaching the bait 44 thereto and for engaging the hook 30 with the rod 38. When an animal enters the trap through the opening 17 in the front wall thereof, and shifts the rod 38 against the tension of the spring 45 by moving the bait 44, the hook 30 will be released from the rod and the spring 31 connected to the bar 27 will move the swinging covers 20 to lowered positions as shown in Fig. 3 with the trap door lowered and traversing the front opening 17. In this position the contents of the trap may be readily discerned by observing through the screen 25.

While I have shown and described the preferred embodiment of my invention, I do not wish to confine myself to the exact details of construction shown, as various forms, modifications and arrangements of parts as shown may be had without departing from the spirit and scope of the invention as claimed.

What I claim as new is:—

1. An animal trap comprising a casing having end walls, a rear wall, and a front wall, transverse partitions dividing the trap into independent sections, a sliding tray for each section, a top wall extending over the rear portion of the casing, a longitudinal rod extending through said partitions and end walls at the forward edge of the top walls, a cover wall for each section pivotally mounted on said rod between adjacent partitions and end walls, a swinging trap door suspended from said cover wall, the said front wall and trap door having registering openings therein, a screen covering the opening in the trap door, a U-shaped metal bar carried by said swinging cover, a U-shaped spring fixed to the casing cover and to said metal bar for normally holding the swinging cover and trap door in closed position, a bait hook in each section, means for supporting the same and coöperating means carried by the bait hook and the U-shaped metal bar carried by the swinging cover for holding the trap door in open position.

2. An animal trap comprising a casing having end walls, a rear wall, and a front wall, transverse partitions dividing the trap into independent sections, a sliding tray for each section, a top wall extending over the rear portion of the casing, a longitudinal rod extending through said partitions and end walls at the forward edge of the top wall, a swinging cover for each section mounted on said rod, means carried by said cover adapted to extend rearwardly of said casing, tension means interposed between the cover wall of the casing and said means for normally holding the swinging cover lowered, a trap door carried by said swinging cover and bait mechanism arranged within each section adapted to engage the means extending rearwardly of the casing for holding the trap door in open position.

3. An animal trap including a casing, a sliding tray for the lower end thereof, a portion of the cover wall being stationary and the remaining portion being swingingly mounted, a trap door carried by the swingingly mounted cover portion of the casing and extending within the front wall thereof, means carried by the stationary and movable cover portions of the casing for normally holding the trap door lowered, and means within said casing adapted to engage the aforesaid means for holding the trap door elevated in set position.

4. An animal trap including a casing, the cover wall of said casing including fixed and movable parts, side plates carried by the movable part, a trap door carried by said side plates and moving in a vertical plane spaced rearwardly of the front wall of the casing, a reversely bent metal bar secured to the movable part of the cover and extending rearwardly of the fixed part thereof, a spring carried by the fixed part of the cover and engaging said metal bar normally holding the trap door in closed position and bait mechanism within the casing adapted to engage the metal bar for holding the trap door in open set position.

5. An animal trap including a casing, a swinging cover section therefor, a trap door carried by the cover section, a rearwardly extending arm carried by the cover section, a spring engaging said arm normally to hold the trap door in closed position, a bait bar extending transversely of the rear end of said trap, the said bar having a cone shaped socket in the front side thereof and a rectangular socket registering therewith in the rear side thereof, the rear wall of the casing having an opening therein registering with the said sockets, a bait hook extending through the cone-shaped socket, a block secured to the rear end of the bait hook, a rod extending rearwardly of said block through the rear wall opening, and means carried by the rearwardly extending arm adapted for engagement with said rod for holding the trap door in open set position.

6. An animal trap including a swinging cover section, a trap door carried thereby, the front wall of the trap and said trap door having registering openings, a screen covering the opening in the trap door, a rearwardly extending arm carried by the swinging cover section, means engaging said arm for holding the trap door in closed position, bait mechanism arranged within said trap and extending rearwardly thereof and means carried by said rearwardly extending arm adapted for engagement with said bait mechanism for holding the trap door in open set position.

In testimony whereof I affix my signature.

MIKE JAKAB.

Copies of this patent may be obtained for five cents each, by addressing the "Commissioner of Patents, Washington, D. C."